(12) United States Patent
Noguchi et al.

(10) Patent No.: US 10,749,215 B2
(45) Date of Patent: Aug. 18, 2020

(54) ELECTROLYTE SOLUTION FOR SECONDARY BATTERY AND SECONDARY BATTERY

(71) Applicant: NEC Corporation, Tokyo (JP)

(72) Inventors: Takehiro Noguchi, Tokyo (JP); Shin Serizawa, Tokyo (JP); Takuya Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 152 days.

(21) Appl. No.: 16/082,458

(22) PCT Filed: Mar. 3, 2017

(86) PCT No.: PCT/JP2017/008561
§ 371 (c)(1),
(2) Date: Sep. 5, 2018

(87) PCT Pub. No.: WO2017/154788
PCT Pub. Date: Sep. 14, 2017

(65) Prior Publication Data
US 2019/0089003 A1    Mar. 21, 2019

(30) Foreign Application Priority Data

Mar. 7, 2016  (JP) ................................ 2016-043894

(51) Int. Cl.
*H01M 10/0569* (2010.01)
*H01M 4/505* (2010.01)
(Continued)

(52) U.S. Cl.
CPC ....... *H01M 10/0569* (2013.01); *H01M 4/505* (2013.01); *H01M 4/525* (2013.01);
(Continued)

(58) Field of Classification Search
CPC .. H01M 4/505; H01M 4/525; H01M 10/0569; H01M 10/525; H01M 10/058;
(Continued)

(56) References Cited

U.S. PATENT DOCUMENTS

2016/0099486 A1*  4/2016  Noguchi ............. H01M 4/5825
429/199

FOREIGN PATENT DOCUMENTS

JP    B 3557724       8/2004
JP    A 2013 255388  12/2013
(Continued)

OTHER PUBLICATIONS

International Search Report dated May 23, 2017, in corresponding PCT International Application.

*Primary Examiner* — Gregg Cantelmo
(74) *Attorney, Agent, or Firm* — Finnegan, Henderson, Farabow, Garrett & Dunner, L.L.P.

(57) ABSTRACT

The purpose of the present invention is to provide a lithium secondary battery which has improved service life characteristics by suppressing a decomposition reaction of the electrolyte solution in the field of batteries that operate at high voltages or are assumed to be used at high temperatures for a long period of time. The present invention relates to an electrolyte solution for a secondary, which is characterized by containing a sulfone compound, a fluorine-containing cyclic acetal compound and a cyclic carbonate in a specific composition; and a secondary battery which uses this electrolyte solution for a secondary battery.

12 Claims, 2 Drawing Sheets

(51) Int. Cl.
  *H01M 4/525*    (2010.01)
  *H01M 10/0525*  (2010.01)
  *H01M 10/058*   (2010.01)
  *H01M 4/02*     (2006.01)

(52) U.S. Cl.
  CPC ..... *H01M 10/058* (2013.01); *H01M 10/0525* (2013.01); *H01M 2004/021* (2013.01); *H01M 2220/20* (2013.01); *H01M 2300/0034* (2013.01); *H01M 2300/0037* (2013.01); *Y02E 60/122* (2013.01); *Y02T 10/7011* (2013.01)

(58) Field of Classification Search
  CPC ....... H01M 2004/021; H01M 2220/20; H01M 2300/0034; H01M 2300/0037
  See application file for complete search history.

(56) References Cited

FOREIGN PATENT DOCUMENTS

| | | |
|---|---|---|
| WO | WO 2012 011507 A1 | 1/2012 |
| WO | WO 2013 129428 A1 | 9/2013 |
| WO | WO 2013 146359    | 10/2013 |
| WO | WO 2014 181877    | 11/2014 |
| WO | WO 2015 080102    | 6/2015 |

\* cited by examiner

ELECTROLYTE SOLUTION FOR SECONDARY BATTERY AND SECONDARY BATTERY

CROSS-REFERENCE TO RELATED PATENT APPLICATIONS

This application is a National Stage Entry of International Application No. PCT/JP2017/008561, filed Mar. 3, 2017, which claims priority from Japanese Patent Application No. 2016-043894, filed Mar. 7, 2016. The entire contents of the above-referenced applications are expressly incorporated herein by reference.

TECHNICAL FIELD

The present invention relates to an electrolyte solution, a secondary battery with the electrolyte solution, and methods for manufacturing the electrolyte solution and the secondary battery.

BACKGROUND ART

Lithium secondary batteries are widely used in notebook-type personal computers, mobile phones and the like, but they are required to improve lifetime characteristics at high temperature and suppress gas generation inside the battery during high temperature operation.

Lithium secondary batteries are widely used for various applications, and therefore, they need to maintain lifetime characteristics and to suppress gas generation inside the battery even when a usable temperature range is set high. In addition, batteries operating at higher voltage than before are developed and need to maintain life characteristics even at high voltage.

During higher voltage operation than before, a decomposition reaction of the electrolytic solution tends to proceed at the contact portion between the positive electrode and the electrolyte solution. In particular, the decomposition reaction generates gas at high temperature. The generated gas raises the internal pressure of a cell and expands a cell, which leads a problem in practical use. For this reason, it is desired to develop an electrolyte solution with less gas generation, high withstand voltage and high high-temperature durability. Fluorinated solvents and the like are considered as the electrolyte solutions with less gas generation and high withstand voltage. Candidates for the fluorinated solvent include fluorinated carbonates, fluorinated carboxylic acid esters, fluorine-containing ether compounds, fluorine-containing phosphate ester compounds, and the like. The fluorinated solvents, which have low compatibility with other electrolyte solvents and high viscosity, cannot bring about the effects of improving lifetime characteristics and reducing gas generation without optimizing the composition of an electrolyte solution. From this viewpoint, the selection of the composition of an electrolyte solution is important for improving battery characteristics. In addition, it is also necessary to develop electrolyte additives and supporting salts for the electrolyte solution operating at high voltage. As another candidate for the electrolyte solvent, cyclic acetals are available. Although non-fluorinated cyclic acetals are low in oxidation resistance, fluorine-containing cyclic acetals can be the candidates for a solvent for a secondary battery. Patent Document 1 discloses examples using a fluorine-containing cyclic acetal. However, the mixed solvent exemplified in Patent Document 1 cannot bring about sufficient life characteristics. Patent Documents 2 and 3 disclose mixed solvents of a fluorine-containing cyclic acetal and a fluorinated ether, but improvement is required in terms of life characteristics.

CITATION LIST

Patent Document

Patent Document 1: Japanese patent No. 3557724
Patent Document 2: WO2013/1294728
Patent Document 3: WO2012/011507

SUMMARY OF INVENTION

Technical Problem

As described above, even when the electrolyte solution disclosed in each of Patent Documents 1 to 3 is used, sufficient life cycle characteristics cannot be obtained. Thus, improvement is needed in terms of combination with other solvents such as those capable of increasing lifetime, the composition of the electrolyte solution, and the like.

An object of the present invention is to provide an electrolyte solution for a secondary battery and a secondary battery with improved life characteristics under high temperature and high voltage conditions.

Solution to Problem

The electrolyte solution for a secondary battery according to the present invention comprises an electrolyte solvent comprising at least one selected from sulfone compounds represented by formula (1), at least one selected from fluorine-containing cyclic acetal compounds represented by formula (2) and a cyclic carbonate compound, wherein a volume ratio of the sulfone compound represented by formula (1) in the electrolyte solvent is more than 10 vol % and less than 60 vol %, a volume ratio of the fluorine-containing cyclic acetal compound represented by formula (2) in the electrolyte solvent is 30 vol % or more and 80 vol % or less, and a volume ratio of the cyclic carbonate compound, in the electrolyte solvent is 0.1 vol % or more and 50 vol % or less.

$$R_1"—SO_2—R_2" \quad (1)$$

($R_1"$ and $R_2"$ each independently represent substituted or unsubstituted alkyl group or alkylene group, carbon atoms of $R_1"$ and $R_2"$ may be bonded through a single bond or a double bond, and the total carbon number of $R_1"$ and $R_2"$ is 2 to 6.)

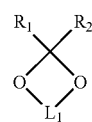

(2)

($R_1$, and $R_2$ are each independently selected from hydrogen, fluorine and alkyl group, $L_1$ is alkylene group having 1 to 5 carbon atoms, and at least one of $R_1$, $R_2$ and $L_1$ is fluorine-containing group.)

Advantageous Effect of Invention

According to the constitution of the present invention, a secondary battery with high energy density and high life characteristics can be provided.

DESCRIPTION OF EMBODIMENTS

<Electrolyte Solution for a Secondary Battery>

Figure 1:
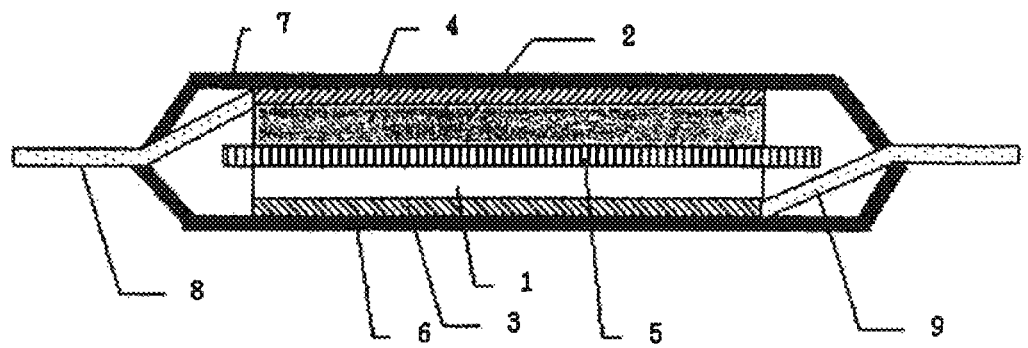
FIG. 1 is a cross-sectional view showing an example of a secondary battery of the present invention.

The electrolyte, solution for a secondary battery of the present embodiment comprises an electrolyte solvent comprising a sulfone compound, a fluorine-containing cyclic acetal compound, and a cyclic carbonate compound.

(Sulfone Compound)

In the present embodiment, the electrolyte solvent comprises at least one selected from sulfone compounds represented by the following formula (1).

$$R_1''-SO_2-R_2'' \quad (1)$$

($R_1''$ and $R_2''$ each independently represent substituted or unsubstituted alkyl group or alkylene group, and carbon atoms of $R_1''$ and $R_2''$ may be bonded through a single bond or a double bond.)

In formula (1), the carbon number n1 of $R_1''$ and the carbon number n2 of $R_2''$ are each independently and preferably $1 \leq n1 \leq 12$ and $1 \leq n2 \leq 12$, more preferably $1 \leq n1 \leq 6$ and $1 \leq n2 \leq 6$, and further preferably $1 \leq n1 \leq 3$ and $1 \leq n2 \leq 3$. The alkyl group includes linear alkyl group, branched alkyl group and cyclic alkyl group. When carbon atoms of $R_1''$ and $R_2''$ are bonded through a single bond or a double bond, the sulfone compound represented by formula (1) is a cyclic compound. The total carbon number of $R_1''$ and $R_2''$ is preferably 2 or more and 12 or less, and more preferably 2 or more and 6 or less.

$R_1''$ and $R_2''$ may have a substituent, and examples thereof include alkyl group having 1 to 6 carbon atoms such as methyl group, ethyl group, propyl group, isopropyl group, butyl group and isobutyl group; aryl group having 6 to 10 carbon atoms such as phenyl group and naphthyl group; halogen atoms such as chlorine atom, bromine atom, and fluorine atom; and the like.

Also, the sulfone compound may be a cyclic compound represented by the following formula (3).

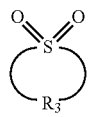

(3)

($R_3$ represents substituted or unsubstituted alkylene group.)

In formula (3), the carbon number of $R_3$ is preferably 3 to 9, more preferably 2 to 6, and most preferably 3 to 6.

$R_3$ may have a substituent, and examples thereof include alkyl group having 1 to 6 carbon atoms such as methyl group, ethyl group, propyl group, isopropyl group, and butyl group; halogen atoms such as chlorine atom, bromine atom, and fluorine atom; and the like.

Examples of the sulfone compound include cyclic sulfones such as sulfolane tetramethylene sulfone), methylsulfolanes such as 3-methylsulfolane 3,4-dimethylsulfolane, 2,4-dimethylsulfolane, trimethylene sulfone (thietane 1,1-dioxide), 1-methyl trimethylene sulfone, pentamethylene sulfone, hexamethylene sulfone and ethylene sulfone; and open chain sulfones such as dimethyl sulfone, ethyl methyl sulfone, diethyl sulfone, butyl methyl sulfone, dibutyl sulfone, methyl isopropyl sulfone, diisopropyl sulfone, methyl tert-butyl sulfone, butyl ethyl sulfone, butyl propyl sulfone, butyl isopropyl sulfone, di-tertbutyl sulfone, diisobutyl sulfone, ethyl isopropyl sulfone, ethyl isobutyl sulfone, tert-butyl ethyl sulfone, propyl ethyl sulfone, isobutyl isopropyl sulfone, butyl isobutyl sulfone and isopropyl (1-methylpropyl) sulfone. Among these, at least one selected from dimethyl sulfone, ethyl methyl sulfone, diethyl sulfone, methyl isopropyl sulfone, and ethyl isopropyl sulfone is preferred.

These sulfone compounds may be used singly or in combination of two or more thereof. In addition, as one aspect of the present embodiment, a cyclic sulfone compound and an open chain sulfone compound can be used in combination.

The sulfone compounds have a comparatively high dielectric constant, improve dissociation characteristics of an electrolyte supporting and increase the electrical conductivity of an electrolyte solution. Also, the sulfone compounds have high oxidation resistance, and gas is less generated even during high temperature operation. On the other hand, since the sulfone compounds have high viscosity, if the concentration thereof is excessively high, the ion conductivity conversely decreases. For this reason, the content of the sulfone compound in the electrolyte solvent is more than 10 vol % and less than 60 vol %, preferably 12 vol % or more and 55 vol % or less, and further preferably 15 vol % or more and 50 vol % or less. When the sulfone compound is contained in an amount of more than 10 vol % in the electrolyte solvent, the compatibility with a solvent such as a fluorine-containing cyclic acetal compound can be enhanced.

(Fluorine-Containing Cyclic Acetal Compound)

In the present embodiment, the electrolyte solvent comprises at least one selected from fluorine-containing cyclic acetal compounds represented by the following formula (2).

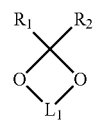

(2)

($R_1$ and $R_2$ are each independently selected from hydrogen, fluorine and alkyl group, $L_1$ is alkylene group having 1 to 5 carbon atoms, and at least one of $R_1$, $R_2$ and $L_1$ is fluorine-containing group.)

When at least one of $R_1$ and $R_2$ is alkyl group, the alkyl group may be linear alkyl group, branched alkyl group or cyclic alkyl group. The carbon number of the alkyl group is preferably 1 or more and 7 or less, more preferably 1 or more and 3 or less, and most preferably 1. The alkyl group may be substituted with fluorine or chlorine. In fluorine-substituted-alkyl group, at least one hydrogen atom of the alkyl group is substituted with fluorine, and all the hydrogen atoms may be substituted with fluorine. In chlorine-substituted alkyl group, at least one hydrogen atom of the alkyl group is substituted with chlorine, and all the hydrogen atoms may be substituted with chlorine. Examples of the fluorine-substituted alkyl group include —CF$_3$, —C$_2$F$_5$, —C$_3$F$_7$, —CF$_2$CH$_3$, —CH$_2$CF$_3$, —CH$_2$CHF$_2$ and the like, and —CF$_3$ is preferred. Examples of the chlorine-substituted alkyl group include —CHCl$_2$, —CClF$_2$ and the like.

L$_1$ is alkylene group having 1 to 5 carbon atoms, and preferably alkylene group having 1 to 3 carbon atoms. The alkylene group may be substituted with fluorine or chlorine. In fluorine-substituted alkylene group, at least one hydrogen atom of the alkylene group is substituted with fluorine, and all the hydrogen atoms may be substituted with fluorine. In chlorine-substituted alkylene group, at least one hydrogen atom of the alkylene group is substituted with chlorine, and all the hydrogen atoms may be substituted with chlorine. The alkylene group may have a substituent other than fluorine and chlorine.

The electrolyte solvent preferably comprises at least one selected from fluorine-containing cyclic acetal compounds represented by the following formula (4).

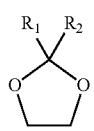

(4)

(R$_1$ and R$_2$ each independently represent alkyl group or hydrogen, and at least one hydrogen atom of formula (4) is substituted with fluorine)

When R$_1$ and/or R$_2$ is alkyl group, the alkyl group may be linear alkyl group, branched alkyl group or cyclic alkyl group. The carbon number of the alkyl group is preferably 1 or more and 7 or less, more preferably 1 or more and 3 or less, and most preferably 1.

The fluorine-containing cyclic acetal compound represented by formula (4) is preferably one having the following structure.

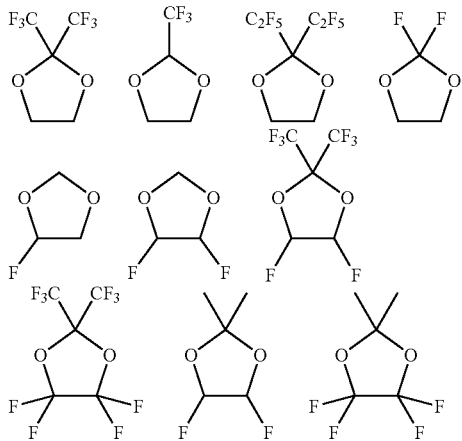

In the fluorine-containing cyclic acetal compound represented by formula (4), at least one of R$_1$ and R$_2$ is preferably fluorine-substituted alkyl group, and both of R$_1$ and R$_2$ are more preferably fluorine-substituted alkyl group. Among the fluorine-containing cyclic acetal compounds represented by formula (4), 2,2-bis(trifluoromethyl)-1,3-dioxolane represented by the following formula and 2-trifluoromethyl-1,3-dioxolane represented by the following formula are especially preferred.

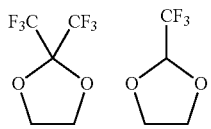

The content of the fluorine-containing cyclic acetal compound in the electrolyte solvent is preferably 30 vol % or more and 80 vol % or less. The fluorine-containing cyclic acetal compound is an effective electrolyte solvent for a positive electrode active material operating at high potential because of high oxidation resistance. However, since the solubility to supporting salts and the compatibility with other solvents are low, if the concentration is too high, it is difficult to obtain a uniform electrolyte solution. The content of the fluorine-containing cyclic acetal compound in the electrolyte solvent is more preferably 32 vol % or more and 75 vol % or less, and still more preferably 35 vol % or more and 70 vol % or less.

The fluorine-containing cyclic acetal compound may be used singly or in combination of two or more thereof.

The fluorine-containing cyclic acetal compounds have low compatibility with other solvents, but the compatibility between the solvents can be improved by adding the sulfone compound. Even if a low-compatibility solvent was once homogeneously mixed, when the solvent is left for a long period of time or when the temperature rises or falls, the solvent separates out in some cases. In contrast, an electrolyte solution containing the fluorine-containing cyclic acetal compound and the sulfone compound is stable for a long time.

(Cyclic Carbonate Compound)

The electrolyte solvent further comprises a cyclic carbonate (including fluorinated one). The cyclic carbonate is not particularly limited, but examples thereof include a compound with a ring in which two oxygen atoms of carbonate group [—O—C(=O)—O—] combine with a hydrocarbon group such as alkylene group or alkenylene group. The carbon number of the hydrocarbon group is preferably 1 or more and 7 or less, and more preferably 2 or more and 4 or less.

Examples of the cyclic carbonate include ethylene carbonate (EC), propylene carbonate (PC), butylene carbonate (BC) and vinylene carbonate (VC). Examples of the fluorinated cyclic carbonate include compounds prepared by substituting a part or the whole of hydrogen atoms of ethylene carbonate (EC), propylene carbonate (PC), butylene carbonate (BC), vinylene carbonate (VC) or the like with a fluorine atom(s). As the fluorinated cyclic carbonates, there can be used, more specifically, for example, 4-fluoro-1,3-dioxolan-2-one (monofluoroethylene carbonate), (cis- or trans-)4,5-difluoro-1,3-dioxolan-2-one, 4,4-difluoro-1,3-dioxolan-2-one and 4-fluoro-5-methyl-1,3-dioxolan-2-one. The cyclic carbonate is, among those listed in the above, from the viewpoint of voltage resistance and conductivity, preferably ethylene carbonate, propylene carbonate, or 4-fluoro-1,3-dioxolan-2-one. The cyclic carbonate can be used singly or concurrently in two or more.

Since the cyclic carbonate has a high relative permittivity, the addition thereof improves the dissociation of a supporting salt and makes it easy for a sufficient conductivity to be imparted. The cyclic carbonate also has an advantage of improving the ionic mobility in the electrolyte. However, at high voltage or high temperature, the cyclic carbonate tends to cause gas generation and capacity reduction, compared with the sulfone compound and the fluorine-containing cyclic acetal compound. On the other hand, the cyclic carbonate forms a film on a negative electrode to improve life characteristics. From the viewpoint of the effect of improving the dissociation of a supporting salt and the effect of improving the ionic mobility in the electrolyte, the content of the cyclic carbonate in the electrolyte solvent is preferably 0.1 vol % or more and 50 volt or less, more preferably 0.5 vol % or more and 45 vol % or less, and still more preferably 1 vol % or more and 40 vol. % or less.

(Other Solvents)

The electrolyte solution may further comprise an open chain carbonate (including a fluorinated one), an open chain carboxylic acid ester (including a fluorinated one), a cyclic carboxylic acid ester (including a fluorinated one), an open chain ether (including a fluorinated one), a phosphate ester (including a fluorinated one), or the like.

The open chain carbonate is not especially limited, but examples thereof include dimethyl carbonate (DMC), ethyl methyl carbonate (EMC), diethyl carbonate (DEC) and dipropyl carbonate (DPC). Further, the open chain carbonate includes fluorinated open chain carbonates. Examples of the fluorinated open chain carbonate include compounds prepared by substituting a part or the whole of hydrogen atoms of ethyl methyl carbonate (EMC), dimethyl carbonate (DMC), diethyl carbonate (DEC), dipropyl carbonate (DPC) or the like with a fluorine atom(s). More specific examples of the fluorinated open chain carbonate include bigfluoroethyl) carbonate, 3-fluoropropyl methyl carbonate and 3,3,3-trifluoropropyl methyl carbonate. Among these, from the viewpoint of voltage resistance and conductivity, dimethyl carbonate is preferred. The open chain carbonate can be used singly or concurrently in two or more.

The carboxylic acid ester is not especially limited, but examples thereof include ethyl acetate, methyl propionate, ethyl formate, ethyl propionate, methyl butyrate, ethyl butyrate, methyl acetate and methyl formate. The carboxylic acid esters further include fluorinated carboxylic acid esters, and examples thereof include compounds prepared by substituting a part or the whole of hydrogen atoms of ethyl acetate, methyl propionate, ethyl formate, ethyl propionate, methyl butyrate, ethyl butyrate, methyl acetate and methyl formate with a fluorine atom(s). These compounds are, for example, ethyl pentafluoropropionate, ethyl 3,3,3-trifluoropropionate, methyl 2,2,3,3-tetrafluoropropionate, 2,2-difluoroethyl acetate, methyl heptafluoroisobutyrate, methyl 2,3,3,3-tetrafluoropropionate, methyl pentafluoropropionate, methyl 2-(trifluoromethyl)-3,3,3-trifluoropropionate, ethyl heptafluorobutyrate, methyl 3,3,3-trifluoropropionate, 2,2,2-trifluoroethyl acetate, isopropyl trifluoroacetate, tert-butyl trifluoroacetate, ethyl 4,4,4-trifluorobutyrate, methyl 4,4,4-trifluorobutyrate, butyl 2,2-difluoroacetate, ethyl difluoroacetate, n-butyl trifluoroacetate, 2,2,3,3-tetrafluoropropyl acetate, ethyl 3-(trifluoromethyl)butyrate, methyl tetrafluoro-2-(methoxy)propionate, 3,3,3-trifluoropropyl 3,3,3-trifluoropropionate, methyl difluoroacetate, 2,2,3,3-tetrafluoropropyl trifluoroacetate, 1H,1H-heptafluorobutyl acetate, methyl heptafluorobutyrate and ethyl trifluoroacetate. Among these, from the viewpoint of voltage resistance, boiling point and the like, preferable are ethyl propionate, methyl acetate, methyl 2,2,3,3-tetrafluoropropionate 2,2,3,3-tetrafluoropropyl trifluoroacetate and the like. The calboxylic acid ester has an effect of decreasing the viscosity of an electrolyte solution in the same manner as the open chain carbonate and the open chain ether. Thus, the calboxylic acid ester may be used instead of the open chain carbonate or the open chain ether. The calboxylic acid ester may be also used in combination with the open chain carbonate or the open chain ether.

The cyclic carboxylic acid ester is not especially limited, but preferable are, for example, γ-lactones such as γ-butyrolactone, α-methyl-γ-butyrolactone and 3-methyl-γ-butyrolactone, β-propiolactone, and δ-valerolactone. Fluorinated ones thereof may be used.

The open chain ether is not especially limited, but dimethyl ether, diethyl ether, ethyl methyl ether, dimethoxyethane and the like may be used. Fluorinated ones thereof may be also used.

Examples of the fluorine-containing ether compound include 2,2,3,3,3-pentafluoropropyl 1,1,2,2-tetrafluoroethyl ether, 1,1,2,2-tetrafluoroethyl 2,2,2-trifluoroethyl ether, 1H,1H,2'H,3H-decafluorodipropyl ether, 1,1,2,3,3,3-hexafluoropropyl-2,2-difluoroethyl ether, isopropyl 1,1,2,2-tetrafluoroethyl ether, propyl 1,1,2,2-tetrafluoroethyl ether, 1,1,2,2-tetrafluoroethyl 2,2,3,3-tetrafluoropropyl ether, 1H,1H,5H-perfluoropentyl-1,1,2,2-tetrafluoroethyl ether, 1H-perfluorobutyl-1H-perfluoropethyl ether, methyl perfluoropentyl ether, methyl perfluorohexyl ether, methyl 1,1,3,3,3-pentafluoro-2-(trifluoromethyl)propyl ether, 1,1,2,3,3,3-hexafluoropropyl 2,2,2-trifluoroethyl ether, ethyl nonafluorobutyl ether, ethyl 1,1,2,3,3,3-hexafluoropropyl ether, 1H,1H,5H-octalluoropentyl 1,1,2,2-tetrafluoroethyl ether, 1H,1H,2'H-perfluorodipropyl ether, heptafluoropropyl 1,2,2,2-tetrafluoroethyl ether, methyl nonafluorobutyl ether, 1,1-difluoroethyl-2,2,3,3-tetrafluoropropyl ether, bis(2,2,3,3-tetrafluoropropyl) ether, 1,1-difluoroethyl-2,2,3,3,3-pentafluoropropyl ether, 1,1-difluoroethyl-1H,1H-heptafluorobutyl ether, 2,2,3,4,4,4-hexafluorobutyl-difluoromethyl ether, bis(2,2,3,3,3-pentafluoropropyl) ether, nonafluorobutyl methyl ether, bis(1H, 1H-hepafluorobutyl) ether, 1,1,2,3,3,3-hexafluoropropyl-1H, 1H-heptafluorobutyl ether, 1H,1H-heptafluorobutyl-trifluoromethyl ether, 2,2-difluoroethyl-1,1,2,2-tetrafluoroethyl ether, bis(trifluoroethyl) ether, bis(2,2-difluoroethyl) ether, bis(1,1,2-trifluoroethyl) ether and 1,1,2-trifluorpethyl-2,2,2-trifluoroethyl ether.

Among these, from the viewpoint of the voltage resistance, the boiling point and the like, preferable are at least one selected from 1,1,2,2-tetrafluoroethyl-2,2,3,3-tetrafluoropropyl ether, 2,2,3,4,4,4-hexafluorobutyl-difluoromethyl ether, 1,1-difluoroethyl-2,2,3,3-tetrafluoropropyl ether, 1,1,2,3,3,3-hexafluoropropyl-2,2-difluoroethyl ether, 1,1-difluoroethyl-1H,1H-heptafluorobutyl ether, 1H,1H,2'H,3H-decalluorodipropyl ether, bis(2,2,3,3,3-pentafluoropropyl) ether, 1H,1H, 5H-perfluoropentyl-1,1,2,2-tetrafluoroethyl ether, bis(1H,1H-heptafluorobutyl) ether, 1H,1H,2'H-perfluorodipropyl ether, 1,1,2,3,3,3-hexafluoropropyl-1H, 1H-heptafluorobutyl ether, 1H-perfluorobutyl-1H-perfluoroethyl ether and bis(2,2,3,3-tetrafluoropropyl) ether.

Examples of the phosphate ester include trimethyl phosphate, triethyl phosphate and tributyl phosphate.

Fluorine-containing phosphate ester may be also used. Examples of the fluorine-containing phosphate ester include 2,2,2-trifluoroethyl dimethyl phosphate, bis(trifluoroethyl) methyl phosphate, bistrifluoroethyl ethyl phosphate, tris(trifluoromethyl) phosphate, pentafluoropropyl dimethyl phosphate, heptafluorobutyl dimethyl phosphate, trifluoroethyl methyl ethyl phosphate, pentafluoropropyl methyl ethyl phosphate, heptafluorobutyl methyl ethyl phosphate, trifluoroethyl methyl propyl phosphate, pentafluoropropyl methyl propyl phosphate, heptafluorobutyl methyl propyl phosphate, trifluoroethyl methyl butyl phosphate, pentafluoropropyl methyl butyl phosphate, heptafluorobutyl methyl butyl phosphate, trifluoroethyl diethyl phosphate, pentafluoropropyl diethyl phosphate, heptafluorobutyl diethyl phosphate, trifluoroethyl ethyl propyl phosphate, pentafluoropropyl ethyl propyl phosphate, heptafluorobutyl ethyl propyl phosphate, trifluoroethyl ethyl butyl phosphate, pentafluoropropyl ethyl butyl phosphate, heptafluorobutyl ethyl butyl phosphate, trifluoroethyl dipropyl phosphate, pentafluoropropyl dipropyl phosphate, heptafluorobutyl dipropyl phosphate, trifluoroethyl propyl butyl phosphate, pentafluoropropyl propyl butyl phosphate, heptafluorobutyl propyl butyl phosphate, trifluoroethyl dibutyl phosphate, pentafluoropropyl dibutyl phosphate, heptafluorobutyl dibutyl phosphate, tris(2,2,3,3-tetrafluoropropyl) phosphate, tris(2,2,3,3,3-pentafluoropropyl) phosphate, tris(2,2,2-trifluoroethyl) phosphate, tris(1H,1H-heptafluorobutyl) phosphate and tris(1H,1H,5H-octafluoropentyl) phosphate.

In addition to the above, the electrolyte solution may comprise dimethylsulfoxide, formamide, acetamide, dimethylformamide, acetonitrile, propionitrile, nitromethane, ethyl monoglyme, trimethexymethane, a dioxolane derivative, 1,3-dimethyl-2-imidazolidinone, 3-methyl-2-oxazolidinone, a tetrahydrofuran derivative, 1,3-propane sultone, anisole, N-methyl pyrrolidone, cyclic disulfone compound, nitrile-based materials, boron-based materials or the like.

Examples of a supporting salt include lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_8SO_2)_2$, $LiN(FSO_2)_2$ (LiFSI), $LiN(CF_3SO_2)_2$, $LiN(C_2F_5SO_2)_2$, $LiB_{10}Cl_{10}$. In addition, the supporting salt includes lower aliphatic lithium carboxylate, chloroboran lithium, lithium tetraphenylborate, LiBr, LiI, LiSCN, LiCl and the like. Among them, $LiPF_6$ and LiFSI are especially preferred from the viewpoint of oxidation resistance, reduction resistance, stability, and ease of dissolution. The supporting salt may be used alone or in combination of two or more. The concentration of the supporting salt in the electrolyte solution is preferably 0.3 mol/l or more and 5 mol/l or less, more preferably 0.4 mol/l or more and 4 mol/l or less, and still more preferably 0.5 mol/l or more and 2 mol/l or less.

An ion-conductive polymer can further be added to the electrolyte solution. Examples of the ion-conductive polymer include polyethers such as polyethylene oxide and polypropylene oxide, and polyolefins such as polyethylene and polypropylene. As the ion-conductive polymer, there can further be used, for example, polyvinylidene fluoride, polytetrafluoroethylene, polyvinyl fluoride, polyvinyl chloride, polyvinylidene chloride, polymethyl methacrylate, polymethyl acrylate, polyvinyl alcohol, polymethacrylonitrile, polyvinyl acetate, polyvinylpyrrolidone, polycarbonate, polyethylene terephthalate, polyhexamethylene adipamide, polycaprolactam, polyurethane, polyethyleneimine, polybutadiene, polystyrene, polyisoprenes or derivatives thereof. The ion-conductive polymer can be used singly or in combination of two or more. There may further be used polymers containing various types of monomer units constituting the above polymers.

The electrolyte solution can be prepared by mixing the above electrolyte solvents. In one aspect, the electrolyte solution for a secondary battery can be prepared by a production method comprising mixing at least one selected from the sulfone compounds represented by formula (1), at least one selected from the fluorine-containing cyclic acetal compounds represented by formula (2) and the cyclic carbonate compound to prepare an electrolyte solvent in which the volume ratio of the sulfone compound represented by formula (1) is more than 10 vol % and less than 60 vol %, the volume ratio of the fluorine-containing cyclic acetal compound represented by formula (2) is 30 vol % or more and 80 vol % or less, and the volume ratio of the cyclic carbonate compound is 0.1 vol % or more and 50 vol % or less; and further adding a supporting salt to the electrolyte solvent.

<Secondary Battery>

A secondary battery can be made using the electrolyte solution for a secondary battery according to the present invention. Herein, embodiments of a lithium ion secondary battery will be described below as an example of batteries using the electrolyte solution for a secondary battery according to the present invention. However, the present invention is not limited to such embodiments, and the electrolyte solution for a secondary battery according to the present invention can be applied to other various secondary batteries.

(Positive Electrode)

A positive electrode active material is bound to a positive electrode current collector by a positive electrode binder to constitute a positive electrode. The positive electrode active material is not especially limited, but examples thereof include spinel-based materials, layered materials and olivine-based materials.

As the spinel-based material,
$LiMn_2O_4$;
materials operating around 4V versus lithium obtainable by substituting part of Mn in $LiMn_2O_4$ to increase lifetime, for example,
$LiMn_{2-x}M_xO_4$
($0<x<0.3$, and M is a metal element and comprises at least one selected from Li, Al, B, Mg, Si and transition metals.);
materials that operate at a high voltage of around 5 V, such as $LiNi_{0.5}Mn_{1.5}O_4$;
materials operating at high voltage and having a similar composition to $LiNi_{0.5}Mn_{1.5}O_4$, obtainable by substituting part of a constituent element of $LiMn_2O_4$ with a transition metal, and those further comprising another element, for example, $$Li_a(M_xMn_{2-x-y}Y_y)(O_{4-w}Z_w) \quad (5)$$

($0.4 \leq x \leq 1.2$, $0 \leq y$, $x+y<2$, $0 \leq a \leq 1.2$, $0 \leq w \leq 1$, M is a transition metal element and comprises at least one selected from the group consisting of Co, Ni, Fe, Cr and Cu, Y is a metal element and comprises at least one selected from the group consisting of Li, B, Na, Al, Mg, Ti, Si, K and Ca, and Z is at least one selected from the group consisting of F and Cl.), and the like may be used.

In formula (5), M preferably comprises a transition metal element(s) selected from the group consisting of Co, Ni, Fe, Cr and Cu at a compositional ratio of 80% or more of x, more preferably 90% or more, and the ratio may be 100%. Y preferably comprises a metal element(s) selected from the group consisting of Li, B, Na, Al, Mg, Ti, Si, K and Ca at a compositional ratio of 80% or more of y, more preferably 90% or more, and the ratio may be 100%.

The layered material is represented by general formula: $LiMO_2$ (M is a metal element), and specific examples include lithium metal composite oxides having a layered structure represented by:
$LiCo_{1-x}M_xO_2$ ($0 \leq x < 0.3$, and M is a metal other than Co.), $$Li_yNi_{1-x}M_xO_2 \quad (6)$$

($0.1 \leq x < 0.8$, $0 < y \leq 1.0$ and M is at least one element selected from the group consisting of Co, Al, Mn, Fe, Ti and B.), in particular, $LiNi_{1-x}M_xO_2$ (0.05<x<0.3, and M is a metal element comprising at least one selected from Co, Mn and Al.), $$Li(Li_xM_{1-x-z}Mn_z)O_2 \quad (7)$$

(0.1≤x<0.3, 0.33≤z≤0.8, and M is at least one of Co and Ni.), or $$Li(M_{1-z}Mn_z)O_2 \quad (8)$$

(0.33≤z<0.7, and M is at least one of Li, Co and Ni).

It is preferred that the content of Ni is high, that is, x is less than 0.5, further preferably 0.4 or less in the above formula (6), Examples of such compounds include $Li_\alpha Ni_\beta Co_\gamma Mn_\delta O_2$ (1≤α≤1.2, β+γ+δ=1, β≤0.6, and γ≤0.2) and $Li_\alpha Ni_\beta Co_\gamma Al_\delta O_2$ (1≤α≤1.2, β+γ+δ=1, β≤0.6, and γ≤0.2) and particularly include $LiNi_\beta Co_\gamma Al_\delta O_2$ (0.75≤β≤0.85, 0.05≤γ≤0.15, and 0.10≤δ≤0.20). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, $LiNi_{0.8}Co_{0.1}Al_{0.1}O_2$ and $LiNi_{0.6}Co_{0.2}Mn_{0.2}O_2$ and the like may be preferably used.

From the viewpoint of thermal stability, it is also preferred that the content of Ni does not exceed 0.5, that is, x is 0.5 or more in formula (6). In addition, it is also preferred that particular transition metals do not exceed half. Examples of such compounds include $Li_\alpha Ni_\beta Co_\gamma Mn_\delta O_2$ (1≤α≤1.2, β+γ+δ=1, 0.2≤β≤0.5, 0.1≤γ≤0.4, and 0.1≤δ≤0.4). More specific examples may include $LiNi_{0.4}Co_{0.8}Mn_{0.8}O_2$ (abbreviated as NCM433), $LiNi_{1/3}Co_{1/3}Mn_{1/3}O_2$, $LiNi_{0.05}Co_{0.2}Mn_{0.3}O_2$ (abbreviated as NCM523), and $LiNi_{0.5}Co_{0.3}Mn_{0.2}O_2$ (abbreviated as NCM532), $LiNi_{0.4}Mn_{0.4}Co_{0.2}O_2$ (also including those in which the content of each transition metal fluctuates by about 10% in these compounds).

Among formula (7), $Li(Li_{0.2}Ni_{0.2}Mn_{0.6})O_2$, $Li(Li_{0.15}Ni_{0.3}Mn_{0.55})O_2$, $Li(Li_{0.15}Ni_{0.2}Co_{0.1}Mn_{0.55})O_2$, $Li(Li_{0.15}Ni_{0.15}Co_{0.15}Mn_{0.55})O_2$, $Li(Li_{0.15}Ni_{0.1}Co_{0.2}Mn_{0.55})O_2$ and the like are preferred.

The olivine-based material is represented by formula (9).

$$LiMPO_4 \quad (9)$$

(M is at least one of Co, Fe, Mn and Ni,) Specifically, $LiFePO_4$, $LiMnPO_4$, $LiCoPO_4$, $LiNiPO_4$ and the like may be exemplified, and some constituent elements thereof may be substituted with another element. For example, the oxygen part thereof may be substituted with fluorine. $LiMPO_4$ comprising at least one of Co and Ni in M is a positive electrode material operating at a high potential of 4.5 V or more versus Li, which can increase battery energy density. For this reason, the compositional ratio of Co and/or Ni in M is preferably 80% or more, and materials represented by the following general formula (10) are particularly preferred.

$$LiMPO_4. \quad (10)$$

(M is at least one of Co and Ni.)

Further, as the positive electrode active material, NASICON type, a lithium transition metal silicon composite oxide and the like may be used. The positive electrode active material may be used singly, or two or more types thereof may be used in mixture.

Among these positive electrodes, positive electrode materials operating at a high potential of 4.35 V or more versus lithium are expected to increase battery energy density. For this reason, the positive electrode active materials of general formulae (5), (6), (7) and (10) are particularly preferred.

The positive electrode active material has a specific surface area of, for example, from 0.01 to 20 m²/g, preferably from 0.05 to 15 m²/g, more preferably from 0.1 to 10 m²/g, and still more preferably from 0.15 to 8 m²/g. A specific surface area in such ranges makes it possible to adjust the area in contact with the electrolyte solution within an appropriate range. That is, a specific surface area of 0.01 m²/g or more can facilitate smooth insertion and extraction of lithium ions and further decrease the resistance. In addition, by setting a specific surface area to 8 m²/g or less, decomposition of the electrolyte solution and elution of the constituent elements of the active material can be further suppressed.

The median particle size of the lithium composite oxide is preferably from 0.01 to 50 μm and more preferably from 0.02 to 40 μm. A particle size of 0.01 μm or more can further suppress elution of the constituent elements of the active material and also further suppress deterioration due to contact with the electrolyte solution. In addition, a particle size of 50 μm or less can facilitate smooth insertion and extraction of lithium ions and further decrease the resistance. The particle size can be measured with a laser diffraction-scattering particle size distribution analyzer.

Examples of the positive electrode binder include, but not particularly limited to, polyvinylidene fluoride (PVdF), vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamide-imide and the like. Among these, from the viewpoints of general versatility and cost reduction, polyvinylidene fluoride is preferred. The amount of the positive electrode binder to be used is preferably 2 to 10 parts by mass based on 100 parts by mass of the positive electrode active material from the viewpoint of a trade-off relationship between "sufficient binding force" and "high energy".

Examples of the positive electrode current collector preferably include, but are not particularly limited to, aluminum, nickel, silver, iron, chromium and alloys thereof. Examples of the shape include foil, plate, and mesh shapes.

To the positive electrode active material layer containing the positive electrode active material, a conductive assisting agent may be added for the purpose of lowering the impedance. Examples of the conductive assisting agent include carbonaceous fine particles such as graphite, carbon blacks, acetylene black.

(Negative Electrode)

The negative electrode active material is not particularly limited. Examples thereof include carbon materials capable of absorbing and desorbing lithium ions (a), metals capable of being alloyed with lithium (b), and metal oxides capable of absorbing and desorbing lithium ions (c).

As the carbon material (a), graphite, amorphous carbon, diamond-like carbon, carbon nanotubes, or composites thereof can be used. Graphite having high crystallinity has high electrical conductivity and has excellent adhesiveness to a negative electrode current collector formed of a metal, such as copper, and excellent voltage flatness. On the other hand, in amorphous carbon having low crystallinity, the volume expansion is relatively small, and therefore, the effect of relieving the volume expansion of the entire negative electrode is large, and deterioration caused by nonuniformity, such as grain boundaries and defects, does not occur easily. The carbon material (a) can be used alone or in combination with other materials.

As the metal (b), a metal mainly composed of Al, Si, Pb, Sn, Zn, Cd, Sb, In, Bi, Ag, Ba, Ca, Hg, Pd, Pt, Te, La, and the like, or alloys comprising two or more of these, or alloys of these metals or alloys with lithium, or the like can be used.

Particularly, the metal (b) preferably comprises silicon (Si). The metal (b) may be used alone or in combination with other materials.

As the metal oxide (c), silicon oxide, aluminum oxide, tin oxide, indium oxide, zinc oxide, lithium oxide, $LiFe_2O_3$, $WO_2$, $MoO_2$, SiO, $SiO_2$, CuO, SnO, $SnO_2$, $Nb_3O_5$, $Li_xTi_{2-x}O_4$ ($1 \leq x \leq 4/3$), $PbO_2$, $Pb_2O_5$ or composites thereof can be used. Particularly, the metal oxide (c) preferably comprises silicon oxide. This is because silicon oxide is relatively stable and does not easily cause reactions with other compounds. In addition, one or two or more elements selected from nitrogen, boron, and sulfur can also be added to the metal oxide (c), for example, in an amount of 0.1 to 5% by mass. By doing this, the electrical conductivity of the metal oxide (c) is improved. The metal oxide (c) may be used alone or in combination with other materials.

In addition, the negative electrode active materials may include, for example, a metal sulfide capable of absorbing and desorbing lithium ions. Examples of the metal sulfide include SnS and $FeS_2$. In addition, examples of the negative electrode active material can include metal lithium, polyacene or polythiophene, or lithium nitride, such as $Li_7MnN_4$, $Li_3FeN_2$, $Li_{2.5}Co_{0.5}N$, or $Li_3CoN$.

The above negative electrode active materials may be used alone or in a mixture of two or more of these.

As these negative electrode active materials, those in the form of particles may be used, or those formed into a film by vapor-phase deposition method or the like on a current collector may be used. In terms of industrial applications, those in the form of particles are preferable.

The specific surface area of particles of these negative electrode active materials is, for example, 0.01 to 100 $m^2/g$, preferably 0.02 to 50 $m^2/g$, more preferably 0.05 to 30 $m^2/g$ and even more preferably 0.1 to 20 $m^2/g$. If the specific surface area is within such a range, the contact area with the electrolytic solution can be adjusted in an appropriate range. Namely, by setting the specific surface area to 0.01 $m^2/g$ or more, smooth insertion and desorption of lithium ions proceeds easily, leading to further reduction in resistance. Further, by setting the specific surface area to 20 $m^2/g$ or less, the promotion of the decomposition of the electrolyte solution and the elution of the constituent elements from the active material can be prevented.

The negative electrode binder is not particularly limited. Examples thereof include polyvinylidene fluoride (PVdF), vinylidene fluoride-hexafluoropropylene copolymers, vinylidene fluoride-tetrafluoroethylene copolymers, styrene-butadiene copolymerized rubbers, polytetrafluoroethylene, polypropylene, polyethylene, polyimides, and polyamideimides.

The content of the negative electrode binder is preferably in the range of 0.1 to 30% by mass, more preferably 0.5 to 25% by mass, based on the total amount of the negative electrode active material and the negative electrode binder. By setting the content to 0.5% by mass or more, the adhesiveness between the active materials or between the active material and the current collector is improved, and the cycle characteristics are improved. In addition, by setting the content to 30% by mass or less, the active material ratio increases, and the negative electrode capacity can be improved.

The negative electrode current collector is not particularly limited, and aluminum, nickel, copper, silver, iron, chromium, and alloys thereof are preferred because of electrochemical stability. Examples of its shape include foil, a flat plate shape, and a mesh shape.

The negative electrode can be made by forming a negative electrode active material layer comprising a negative electrode active material and a negative electrode binder on a negative electrode current collector. Examples of the method for forming the negative electrode active material layer include a doctor blade method, a die coater method, a CVD method, and a sputtering method. It is possible to previously form a negative electrode active material layer and then form a thin film of aluminum, nickel, or an alloy thereof by a method such as vapor deposition or sputtering to provide a negative electrode current collector.

(Separator)

The secondary battery may consist of a combination of a positive electrode, a negative electrode, a separator, and a nonaqueous electrolyte as its configuration. Examples of the separator include woven fabrics, nonwoven fabrics, porous polymer films of polyolefins, such as polyethylene and polypropylene, polyimides, porous polyvinylidene fluoride films, and the like, or ion-conducting polymer electrolyte films. These may be used alone or in combination. In addition, an aramid resin separator may be used. The aramid resin separator may be used in the form of nonwoven fabrics or microporous film.

(Shape of Battery)

Examples of the shape of the secondary battery include a cylindrical shape, a rectangular shape, a coin type, a button type, and a laminate type. Examples of the package of the battery include stainless, iron, aluminum, titanium, or alloys thereof, or plated articles thereof. As the plating, for example, nickel plating may be used.

Examples of the laminate resin film used in the laminate type include aluminum, aluminum alloy, stainless and titanium foil, Examples of the material of the thermally bondable portion of the metal laminate resin film include thermoplastic polymer materials, such as polyethylene, polypropylene, and polyethylene terephthalate. In addition, each of the numbers of the metal laminate resin films and the metal foil layers is not limited to one and may be two or more.

FIG. 1 shows one example of the structure of the secondary battery according to the present embodiment. The lithium secondary battery comprises a positive electrode active material layer 1 containing a positive electrode active material on a positive electrode current collector 3 formed of a metal, such as aluminum foil, and a negative electrode active material layer 2 containing a negative electrode active material on a negative electrode current collector 4 formed of a metal, such as copper foil. The positive electrode active material layer 1 and the negative electrode active material layer 2 are disposed opposed to each other via an electrolyte solution and a separator 5 formed of a nonwoven fabric, a polypropylene microporous film, or the like comprising the electrolyte solution. In FIG. 1, reference numerals 6 and 7 denote a package, reference numeral 8 denotes a negative electrode tab, and reference numeral 9 denotes a positive electrode tab.

Figure 3:
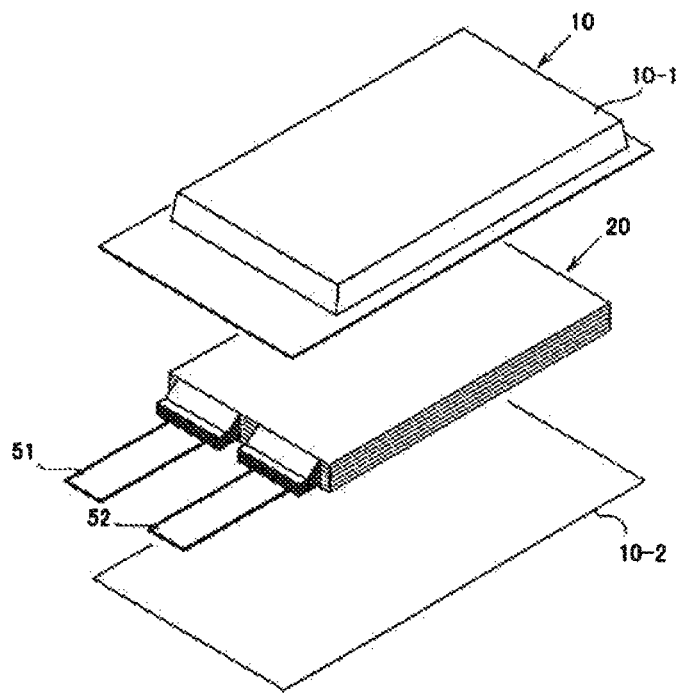
FIG. 3 is an exploded perspective view showing a basic structure of a film package battery.
Figure 4:
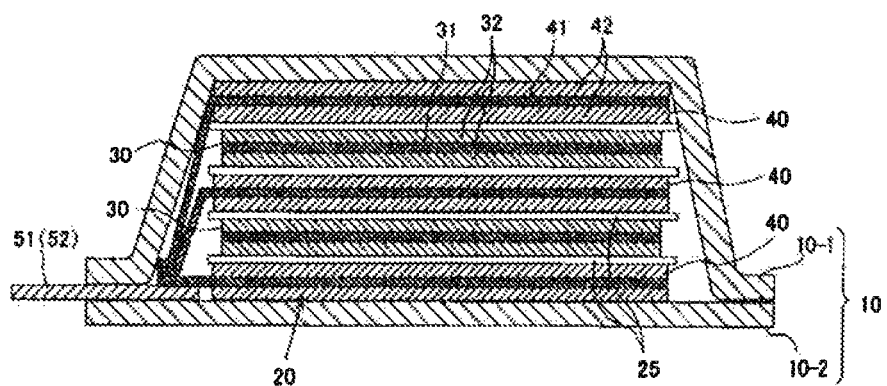
FIG. 4 is a cross-sectional view schematically showing a cross section of the battery of FIG. 3.

In another embodiment, the secondary battery may have a structure as shown in FIGS. 3 and 4. This lithium ion secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 4. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

Although the electrode tabs are drawn out to both sides of the outer package in the battery of FIG. 1, the lithium ion secondary battery according to the present embodiment may have an arrangement in which the electrode tabs are drawn out to one side of the outer package as shown in FIG. 3. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51. (see FIG. 4). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 3, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 3 and FIG. 4, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

(Method for Manufacturing Secondary Battery)

The secondary battery according to the present embodiment can be manufactured by a conventional method. An example of a method for manufacturing a secondary battery will be described taking a stacked laminate type secondary battery as an example. First, in the dry air or an inert atmosphere, the positive electrode and the negative electrode are placed to oppose to each other via a separator to form an electrode element. Next, this electrode element is accommodated in an outer package (container), an electrolyte solution is injected, and the electrodes are impregnated with the electrolyte solution. Thereafter, the opening of the outer package is sealed to complete the secondary battery.

(Assembled Battery)

A plurality of the secondary batteries according to the present embodiment may be combined to form an assembled battery. The assembled battery may be configured by connecting two or more secondary batteries according to the present embodiment in series or in parallel or in combination of both. The connection in series and/or parallel makes it possible to adjust the capacitance and voltage freely. The number of the secondary batteries included in the assembled battery can be set appropriately according to the battery capacity and output.

(Vehicle)

The secondary battery or the assembled battery according to the present embodiment can be used in vehicles. Vehicles according to the present embodiment include hybrid vehicles, fuel cell vehicles, electric vehicles (besides four-wheel vehicles (cars, trucks, commercial vehicles such as buses, light automobiles, etc.) two-wheeled vehicle (bike) and tricycle), and the like. The vehicle according to the present embodiment is not limited to automobiles, and it may be a variety of power source of other vehicles, such as a moving body like a train.

Example

Specific examples according to the present invention will be described below, but the present invention is not limited to these examples and can be carried out by making appropriate changes without departing from the spirit thereof. FIG. 1 is a schematic diagram showing the configuration of lithium secondary batteries made in these examples.

(Evaluation of EC/DES/FDOL)

$LiNi_{0.5}Mn_{1.5}O_4$ as a positive electrode active material, polyvinylidene fluoride as a binder (4 mass %), and carbon black as a conductive assisting agent (4 mass %) were mixed to prepare a positive electrode mixture. The positive electrode mixture was dispersed into N-methyl-2-pyrrolidone to prepare a positive electrode slurry. One surface of a 20 µm thick aluminum current collector was uniformly coated with this positive electrode slurry. The thickness of the coating film was adjusted so that the initial charge capacity per unit area was 2.5 mAh/cm². The coated current collector was dried and then compression-shaped by a roll press to make a positive electrode.

As a negative electrode active material, artificial graphite was used. The artificial graphite was dispersed in N-methylpyrrolidone in which MTH as a binder was dissolved, to prepare a negative electrode slurry. The mass ratio of the negative electrode active material and the binder was 95/5. A 10 µm thick Cu current collector was uniformly coated with this negative electrode slurry. The thickness of the coating film was adjusted so that the initial charge capacity per unit area was 3.0 mAh/cm². The coated current collector was dried and then compression-shaped by a roll press to make a negative electrode.

The positive electrode and the negative electrode cut into 3 cm×3 cm were disposed so as to be opposed to each other via a separator. As the separator, a 25 µm thick microporous polypropylene film was used.

Ethylene carbonate (EC), diethyl sulfone (DES), 2,2-bis (trifluoromethyl)-1,3-dioxolane (FDOL), sulfolane (SL), and diethyl carbonate (DEC) were used as electrolyte solvents. In preparing the electrolyte solution, the volume ratio was determined from the mass and the room temperature density of FDOL, DES, EC, SL and DEC (1.53 g/cc, 1.36 g/cc, 1.32 g/cc, 1.26 g/cc and 0.97 g/cc). DES alone is solid at room temperature, and the volume ratio was determined using the solid density (1.36 g/cc). $LiPF_6$ or LiESI [Lithium bis(fluorosulfonyl)imide] was added in an amount of 0.8 mol/L based on the total volume of a mixed solvent, to prepare an electrolyte solution. The electrolytic solution was stirred at 45° C. for 2 hours and left to stand at room temperature for 1 day, and then the state was visually observed. When a precipitate occurred or when the electrolyte solution separated into two phases, the homogeneous mixability was marked as "bad", and when the electrolyte solution was homogeneous and transparent, the homogeneous mixability was marked as "good". The results are shown in Table 1. When the electrolyte solution could be homogeneously mixed, the positive electrode, the negative electrode, the separator and the electrolytic solution were placed in the laminate package, and the laminate package was sealed to prepare a lithium secondary battery. The positive electrode and the negative electrode were brought into a state in which tabs were connected and the positive electrode and the negative electrode were electrically connected from the outside of the laminate. When the electrolyte solution could not be homogeneously mixed, evaluation of cycle characteristics was not conducted.

The fabricated battery was charged at 20 mA, and after the voltage reached the upper limit of 4.75 V, the battery was charged at constant voltage until the total charge time reached 2.5 hours. Then the battery was discharged at a constant current of 20 mA until the voltage reached the lower limit of 3 V. This charge/discharge was repeated 200 times. The cell was disposed in a thermostat chamber at 45° C. during the charge/discharge. The ratio of the capacity at the 2001 cycle to the capacity at the 1st cycle (capacity retention rate after 200 cycles at 45° C.) was evaluated. The results thereof are shown in Table 1.

Figure 2:
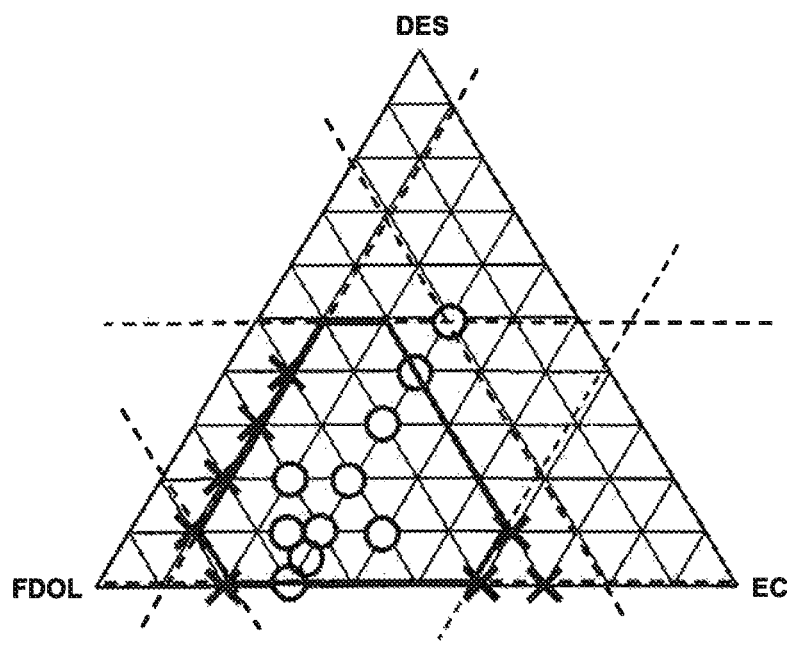
FIG. 2 is a ternary phase map showing the homogeneous mixability of electrolyte solutions using etylenecarbonate (EC), diethyl sulfone (DES) and 2,2-bis(trifluoromethyl)-1,3-dioxolane (FDOL) as electrolyte solvents.

The electrolyte solution was a homogeneous mixture when FDOL, DES and EC were within a specific composition range as shown in FIG. 2. As in FIG. 2, the volume ratio of the fluorinated-dioxolane is preferably 20 vol % or more and preferably 80 vol % or less to obtain a homogeneous electrolyte solution. The composition ratio of the sulfone compound is preferably more than 10 vol % and preferably less than 60 vol %.

The capacity retention rate of Comparative example 3, in which EC was not used, was very low. In contrast, the capacity retention rate of Example 7, in which 2 vol % of EC was used, was very high. These results show that EC forms a film on the positive electrode or the negative electrode to suppress reactions between FDOL or DES and the electrodes. On the other hand, when EC was excessive as in Example 9 and Comparative example 12, the capacity retention rate was low. This is presumed to be because EC

TABLE 1

| | Supporting salt | Solvent composition (volume ratio) | Homogeneous mixablity | Capacity retention rate |
|---|---|---|---|---|
| Comparative example 1 | 1 mol/l $LiPF_6$ | EC/DEC = 30/70 | Good | 59% |
| Comparative example 2 | 1 mol/l $LiPF_6$ | SL/FDOL = 70/30 | Good | 10% |
| Comparative example 3 | 0.8 mol/l $LiPF_6$ | DES/FDOL = 30/70 | Good | 40% |
| Comparative example 4 | 0.8 mol/l $LiPF_6$ | EC/DES/FDOL = 0/20/80 | Bad | — |
| Comparative example 5 | 0.8 mol/l $LiPF_6$ | EC/DES/FDOL = 10/10/80 | Bad | — |
| Comparative example 6 | 0.8 mol/l $LiPF_6$ | EC/DES/FDOL = 20/10/70 | Bad | — |
| Comparative example 7 | 0.8 mol/l $LiPF_6$ | EC/DES/FDOL = 30/10/60 | Bad | — |
| Comparative example 8 | 0.8 mol/l $LiPF_6$ | EC/DES/FDOL = 40/10/50 | Bad | — |
| Comparative example 9 | 0.8 mol/l $LiPF_6$ | DES/FDOL = 60/40 | Bad | — |
| Comparative example 10 | 0.8 mol/l $LiPF_6$ | DES/FDOL = 70/30 | Bad | — |
| Comparative example 11 | 0.8 mol/l $LiPF_6$ | EC/DES/FDOL = 10/60/30 | Bad | — |
| Example 1 | 0.8 mol/l $LiPF_6$ | EC/DES/FDOL = 10/30/60 | Good | 83% |
| Example 2 | 0.8 mol/l $LiPF_6$ | EC/DES/FDOL = 10/25/65 | Good | 82% |
| Example 3 | 0.8 mol/l $LiPF_6$ | EC/DES/FDOL = 20/20/60 | Good | 81% |
| Example 4 | 0.8 mol/l $LiPF_6$ | EC/DES/FDOL = 20/30/50 | Good | 82% |
| Example 5 | 0.8 mol/l $LiPF_6$ | EC/DES/FDOL = 30/30/40 | Good | 80% |
| Example 6 | 0.8 mol/l $LiPF_6$ | EC/DES/FDOL = 10/40/50 | Good | 79% |
| Example 7 | 0.8 mol/l $LiPF_6$ | EC/DES/FDOL = 2/28/70 | Good | 75% |
| Example 8 | 0.8 mol/l $LiPF_6$ | EC/DES/FDOL = 5/30/65 | Good | 80% |
| Example 9 | 0.8 mol/l $LiPF_6$ | EC/DES/FDOL = 40/30/30 | Good | 74% |
| Comparative example 12 | 0.8 mol/l $LiPF_6$ | EC/DES/FDOL = 50/30/20 | Good | 58% |
| Example 10 | 1.2 mol/l $LiPF_6$ | EC/DES/FDOL = 30/30/40 | Good | 80% |
| Example 11 | 0.6 mol/l $LiPF_6$ and 0.2 mol/l LiFSI | EC/DES/FDOL = 5/35/60 | Good | 79% |

The electrolyte solutions of Comparative examples 4 to 8, 11 and 12 and Examples 1 to 9 in Table 1 comprises a fluorinated-dioxolane (FDOL), ethylene carbonate (EC) and a sulfone compound (DES), and the homogeneous mixablity of these electrolyte solutions is shown in the ternary phase map of FIG. 2. Compositions marked as "o" in FIG. 2 were mixed homogeneously, and compositions marked as "x" in FIG. 2 had a precipitate or an isolated solvent. Fluorinated compounds such as fluorinated-dioxolane have low compatibility with other solvents and are isolated as in water and oil in some cases. However, the fluorinated compounds were found to be compatible in the presence of a specific amount of the sulfone compound.

reacted with the positive electrode and negative electrode. From such results, the composition range of the cyclic carbonate is preferably 0.1 vol % or more and preferably 50 vol % or less. An electrolyte solution in which SL and FDOL were mixed at a volume ratio of 70/30 was evaluated in Comparative example 2. SL could be dissolved, but the capacity retention rate was very low. The sulfone compound was excessive, and the capacity retention rate was lowered.

The bold line region in FIG. 2 is a preferred region in which the capacity retention rates after the cycle evaluation were high. Specifically, the content of the fluorinated-dioxolane is preferably 30 vol % or more and 80 vol % or less, the content of the sulfone compound is preferably more than 10 vol % and less than 60 vol %, and the content of the cyclic carbonate is preferably 0.1 vol % or more and 50 vol % or less. The content of the fluorinated-dioxolane is more preferably 32 vol % or more and 75 vol % or less, the content of the sulfone compound is more preferably 12 vol % or more and 55 vol % or less, and the content of the cyclic carbonate is more preferably 0.5 vol % or more and 45 vol % or less. The content of the fluorinated-dioxolane is still more preferably 35 vol % or more and 70 vol % or less, the content of the sulfone compound is still more preferably 15 vol % or more and 50 vol % or less, and the content of the cyclic carbonate is still more preferably 1 vol % or more and 40 vol % or less.

(Evaluation of Other Solvents)

Subsequently, the amount and the type of the sulfone compound solvent in the electrolyte solution were evaluated. As the sulfone compounds, sulfolane (SL), 3-methylsulfolane (MSL), dimethyl sulfone (DMS), ethyl methyl sulfone (EMS), diethyl sulfone (DES), methyl isopropyl sulfone (MiPS), ethyl isopropyl sulfone (EiPS) were used. As the cyclic carbonates, ethylene carbonate (EC), propylene carbonate (PC) and fluoroethylene carbonate (FEC) were used. As the fluorinated cyclic acetal compounds, 2,2-bis(trifluoromethyl)-1,3-dioxolane (FDOL) and 2-(trifluoromethyl)-1,3-dioxolane (FDOL2) were used. These electrolyte solvents were mixed at a volume ratio shown in Table 2. $LiPF_6$ was dissolved at a concentration of 0.8 mol/l in the mixed solvent to prepare an electrolyte solution. The volume ratio of the solvent was measured using the weight and the room temperature density (PC:1.2 g/cc, FEC:1.5 g/cc, DMS:1.16 g/cc, EMS:1.35 g/cc, MiPS:1.13 g/cc, EiPS:1.09 g/cc, MSL:1.19 g/cc, FDOL2:1.46 g/cc). The same lifetime evaluation was conducted using a battery with the electrolyte solvent shown in Table 2 and the same positive and negative electrodes as in Example 1. The results of the capacity retention rates are shown in Table 2.

TABLE 2

|  | Solvent composition (volume ratio) | Capacity retention rate |
|---|---|---|
| Example 12 | EC/SL/EDOL = 30/20/50 | 69% |
| Example 13 | EC/MSL/FDOL = 30/20/50 | 66% |
| Example 14 | EC/DMS/FDOL = 30/20/50 | 76% |
| Example 15 | EC/EMS/FDOL = 30/20/50 | 78% |
| Example 16 | EC/MiPS/FDOL = 30/20/50 | 74% |
| Example 17 | EC/EiPS/FDOL = 30/20/50 | 75% |
| Example 18 | EC/EiPS/FDOL = 5/35/60 | 79% |

TABLE 2-continued

|  | Solvent composition (volume ratio) | Capacity retention rate |
|---|---|---|
| Example 19 | FEC/DES/FDOL = 2/38/60 | 82% |
| Example 20 | EC/PC/DES/FDOL = 5/5/30/60 | 80% |
| Example 21 | EC/DES/FDOL2 = 30/20/60 | 75% |

As shown in Table 2, the electrolyte solutions comprising a sulfone compound such as SL, MSL, DMS, EMS, MiPS or EiPS brought about good lifetime characteristics. In particular, open chain sulfone compounds such as DMS, EMS, DES, MiPS and EiPS brought about good lifetime characteristics.

Even when a cyclic carbonate such as PC or FEC was used instead of EC, similar good characteristics could be obtained. Even when 2-(trifluoromethyl)-1,3-dioxolane (FDOL2) was used instead of 2,2-bis(trifluoromethyl)-1,3-dioxolane (FDOL), similar good characteristics could be obtained.

(Evaluation of Positive Electrode and Negative Electrode)

Subsequently, various positive electrodes and negative electrodes were evaluated. 5V class spinel type $LiNi_{0.5}Mn_{1.3}Ti_{0.2}O_4$, layered type $LiNi_{1/3}Co_{1/3}Mn_{1/3}O_2$, Li excess layered type $Li(Li_{0.2}Ni_{0.2}Mn_{0.6})O_2$, olivine type $LiCoPO_4$ and spinel type $Li(Mn_{1.88}Al_{0.05}Li_{0.07})O_4$ were used as positive electrode materials to conduct the evaluation. Graphite, SiO and Si alloy were used in the negative electrodes. The SiO was composite particles of Si and $SiO_2$, the surface of which was coated with carbon, and the mass ratio of the Si compound to the carbon was 95/5. The SiO was dispersed in N-methylpyrrolidone in which a polyimide binder was dissolved, to prepare a negative electrode slurry. The mass ratio of the negative electrode active material to the binder was 85/15. The thickness of the coating film was adjusted so that the initial charge capacity per unit area was 3.0 mAh/cm$^2$, to produce a negative electrode. The Si alloy was an alloy of Si and Sn, in which the mass ratio Si/Sn was 60/40. In the method of producing the positive electrode and negative electrode, the same conditions were used as in Example 1. The electrolyte solution was 1 mol/l-$LiPF_6$ EC/DEC=30/70 (volume ratio), which is referred to as A in Table 3, or 0.8 mol/l-$LiPF_6$ EC/DES/FDOL=10/25/65 (volume ratio), which is referred to as B in Table Charging voltage and discharging voltage in the evaluation of cycle characteristics were set to the values shown in Table 3 according to the combination of the positive and negative electrode materials. The results of the capacity retention rates after 200 cycles at 45° C. are shown in Table 3.

TABLE 3

|  | Positive electrode material | Negative electrode material | Electrolyte solution | Voltage range in cycle evaluation | Capacity retention rate |
|---|---|---|---|---|---|
| Comparative example 13 | $LiNi_{0.5}Mn_{1.3}Ti_{0.2}O_4$ | Graphite | A | 4.75 to 3 V | 68% |
| Example 22 | $LiNi_{0.5}Mn_{1.3}Ti_{0.2}O_4$ | Graphite | B | 4.75 to 3 V | 86% |
| Comparative example 14 | $LiNi_{1/8}Co_{1/8}Mn_{1/8}O_2$ | Graphite | A | 4.35 to 3 V | 72% |
| Example 23 | $LiNi_{1/8}Co_{1/8}Mn_{1/8}O_2$ | Graphite | B | 4.35 to 3 V | 90% |
| Comparative example 15 | $Li(Li_{0.2}Ni_{0.2}Mn_{0.6})O_2$ | SiO | A | 4.5 to 2 V | 68% |
| Example 24 | $Li(Li_{0.2}Ni_{0.2}Mn_{0.6})O_2$ | SiO | B | 4.5 to 2 V | 76% |
| Comparative example 16 | $Li(Li_{0.2}Ni_{0.2}Mn_{0.6})O_2$ | Si alloy | A | 4.5 to 2 V | 52% |
| Example 25 | $Li(Li_{0.2}Ni_{0.2}Mn_{0.6})O_2$ | Si alloy | B | 4.5 to 2 V | 72% |
| Comparative example 17 | $LiCoPO_4$ | Graphite | A | 4.8 to 3 V | 52% |
| Example 26 | $LiCoPO_4$ | Graphite | B | 4.8 to 3 V | 63% |

TABLE 3-continued

|  | Positive electrode material | Negative electrode material | Electrolyte solution | Voltage range in cycle evaluation | Capacity retention rate |
|---|---|---|---|---|---|
| Comparative example 18 | Li(Mn$_{1.88}$Al$_{0.05}$Li$_{0.07}$)O$_4$ | Graphite | A | 4.2 to 3 V | 86% |
| Example 27 | Li(Mn$_{1.88}$Al$_{0.05}$Li$_{0.07}$)O$_4$ | Graphite | B | 4.2 to 3 V | 89% |

The improvement effect of Li(Mn$_{1.22}$Al$_{0.05}$Li$_{0.07}$)O$_4$ charged at 4.2 V was larger in the case of EC/DES/FDOL (Example 27) than in the case of EC/DEC (Comparative example 18), although the capacity retention rate of Comparative example 18 was also high. The improvement effects of the other positive electrodes of Table 3, which operates at high potential, were especially large. That is, the improvement effect of the electrolyte solution of the present invention was especially large when a positive electrode material operated at 4.35 V or more versus the lithium standard electrode potential. This is conceivably because the oxidation resistance of the electrolytic solution of the present invention was high. As to Example 23, the potential of the negative electrode graphite is about 0.03 V versus the lithium standard electrode potential when the battery is in a charging state, Therefore, when the battery is in a charging state of 4.35 V, the positive electrode potential is 4.35 V or more versus the lithium standard electrode potential.

As described above, the electrolyte solution of the present embodiment had a lifetime improvement effect. This makes it possible to provide a lithium secondary battery with a long lifetime.

The whole or part of the exemplary embodiments disclosed above can be described as, but not limited to, the following supplementary notes.

(Supplementary Note 1)

An electrolyte solution for a secondary battery comprising an electrolyte solvent comprising at least one selected from sulfone compounds represented by formula (1), at least one selected from fluorine-containing cyclic acetal compounds represented by formula (2), and a cyclic carbonate compound, wherein a volume ratio of the sulfone compound represented by formula (1) in the electrolyte solvent is more than 10 vol % and less than 60 vol %, a volume ratio of the fluorine-containing cyclic acetal compound represented by formula (2) in the electrolyte solvent is 30 vol % or more and 80 vol % or less, and a volume ratio of the cyclic carbonate compound in the electrolyte solvent is 0.1 vol % or more and 50 vol % or less.

wherein R$_1$" and R$_2$" each independently represent substituted or unsubstituted alkyl group or alkylene group, carbon atoms of R$_1$" and R$_2$" may be bonded through a single bond or a double bond, and the total carbon number of R$_1$" and R$_2$" is 2 to 6.

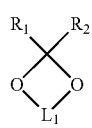

wherein R$_1$ and R$_2$ are each independently selected from hydrogen, fluorine and alkyl group, L$_1$ is alkylene group having 1 to 5 carbon atoms, and at least one group of R$_1$, R$_2$ and L$_1$ is fluorine-containing group.

(Supplementary Note 2)

The electrolyte solution for a secondary battery according to supplementary note 1, wherein the sulfone compound is an open chain sulfone.

(Supplementary Note 3)

The electrolyte solution for a secondary battery according to supplementary note 2, wherein the sulfone compound is at least one selected from dimethyl sulfone, ethyl methyl sulfone, diethyl sulfone, methyl isopropyl sulfone, and ethyl isopropyl sulfone.

(Supplementary Note 4)

The electrolyte solution for a secondary battery according to any one of supplementary notes 1 to 3, wherein the fluorine-containing cyclic acetal compound is represented by formula (3).

wherein R$_1$ and R$_2$ each independently represent alkyl group having 1 to 3 carbon atoms or hydrogen, and at least one hydrogen atom of formula (3) is substituted with fluorine.

(Supplementary Note 5)

The electrolyte solution for a secondary battery according to supplementary note 4, wherein the fluorine-containing cyclic acetal compound is 2,2-bis(trifluoromethyl)-1,3-dioxolane and/or 2-(trifluoromethyl)-1,3-dioxolane.

(Supplementary Note 6)

The electrolyte solution for a secondary battery according to any one of supplementary notes 1 to 5, wherein the cyclic carbonate compound is at least one selected from ethylene carbonate, propylene carbonate and 4-fluoro-1,3-dioxolan-2-one.

(Supplementary Note 7)

The electrolyte solution for a secondary battery according to any one of supplementary notes 1 to 6, wherein a supporting salt is lithium hexafluorophosphate and/or lithium bis(fluorosulfonyl)imide, and a concentration of the supporting salt in the electrolyte solution is 0.5 mol/l or more and 2 mol/l or less.

(Supplementary Note 8)

A secondary battery comprising the electrolyte solution for a secondary battery according to any one of supplementary notes 1 to 7.

(Supplementary Note 9)

The secondary battery according to supplementary note 8, comprising a positive electrode comprising a positive electrode active material capable of inserting and desorbing Li at 4.35 V or more versus a standard electrode potential of Li.

(Supplementary Note 10)

10. The secondary battery according to supplementary note 8 or 9, comprising at least one positive electrode active material selected from lithium metal composite oxides represented by formulae (4) to (7).

$$Li_a(M_xMn_{2-x-y}Y_y)(O_{4-w}Z_w) \qquad (4)$$

wherein $0.4 \leq x \leq 1.2$, $0 \leq y$, $x+y<2$, $0 \leq a \leq 1.2$, $0 \leq w \leq 1$, M is a transition metal and comprises at least one selected from the group consisting of Co, Ni, Fe, Cr and Cu, Y is a metal element and comprises at least one selected from the group consisting of Li, B, Na, Al Mg, Ti, Si, K and Ca, and Z is at least one of F and Cl, $$Li_yNi_{1-x}M_xO_2 \qquad (5)$$

wherein $0 \leq x < 0.8$, $0 < y \leq 1.0$ and M is at least one element selected from the group consisting of Co, Al, Mn, Fe, Ti and B, $$Li(Li_xM_{1-x-z}Mn_z)O_2 \qquad (6)$$

wherein $0.1 \leq x < 0.3$, $0.33 \leq z \leq 0.8$, and M is at least one of Co and Ni, and $$LiMPO_4 \qquad (7)$$

wherein M is at least one of Co and Ni.

(Supplementary Note 11)

11. The secondary battery according to any one of supplementary notes 8 to 10, comprising at least one negative electrode active material selected from graphite, Si oxides, and Si alloys.

(Supplementary Note 12)

12. A vehicle equipped with the secondary battery according to any one of supplementary notes 8 to 11.

(Supplementary Note 13)

13. A method of producing an electrolyte solution for a secondary battery, comprising the steps of mixing at least one selected from sulfone compounds represented by formula (1), at least one selected from fluorine-containing cyclic acetal compounds represented by formula (2), and a cyclic carbonate compound to prepare an electrolyte solvent in which a volume ratio of the sulfone compound represented by formula (1) is more than 10 vol % and less than 60 vol %, a volume ratio of the fluorine-containing cyclic acetal compound represented by formula (2) is 30 vol % or more and 80 vol % or less, and a volume ratio of the cyclic carbonate compound is 0.1 vol % or more and 50 vol % or less, and adding a supporting salt to the electrolyte solvent.

$$R_1''{-}SO_2{-}R_2'' \qquad (1)$$

wherein $R_1''$ and $R_2''$ each independently represent substituted or unsubstituted alkyl group or alkylene group, carbon atoms of $R_1''$ and $R_2''$ may be bonded through a single bond or a double bond, and the total carbon number of $R_1''$ and $R_2''$ is 2 to 6.

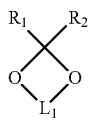

(2)

wherein $R_1$ and $R_2$ are each independently selected from hydrogen, fluorine and alkyl group, $L_1$ is alkylene group having 1 to 5 carbon atoms, and at least one group of $R_1$, $R_2$ and $L_1$ is fluorine-containing group.

This application claims priority right based on Japanese patent application No. 2016-43894, filed on Mar. 7, 2016, the entire disclosure of which is hereby incorporated by reference.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

EXPLANATION OF REFERENCE 1 positive electrode active material layer
2 negative electrode active material layer
3 positive electrode current collector
4 negative electrode current collector
5 separator
6 laminate package
7 laminate package
8 negative electrode tab
9 positive electrode tab
10 film package
20 battery element
25 separator
30 positive electrode
40 negative electrode

The invention claimed is:

1. An electrolyte solution for a secondary battery comprising an electrolyte solvent comprising at least one selected from sulfone compounds represented by formula (1),
at least one selected from fluorine-containing cyclic acetal compounds represented by formula (2), and
a cyclic carbonate compound,
wherein a volume ratio of the sulfone compound represented by formula (1) in the electrolyte solvent is more than 10 vol % and less than 60 vol %,
a volume ratio of the fluorine-containing cyclic acetal compound represented by formula (2) in the electrolyte solvent is 30 vol % or more and 80 vol % or less, and
a volume ratio of the cyclic carbonate compound in the electrolyte solvent is 0.1 vol % or more and 50 vol % or less, $$R_1''{-}SO_2{-}R_2'' \qquad (1)$$

wherein $R_1''$ and $R_2''$ each independently represent substituted or unsubstituted alkyl group or alkylene group, carbon atoms of $R_1''$ and $R_2''$ may be bonded through a single bond or a double bond, and the total carbon number of $R_1''$ and $R_2''$ is 2 to 6, and

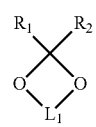

(2)

wherein $R_1$ and $R_2$ are each independently selected from hydrogen, fluorine and alkyl group, $L_1$ is alkylene group having 1 to 5 carbon atoms, and at least one group of $R_1$, $R_2$ and $L_1$ is fluorine-containing group.

2. The electrolyte solution for a secondary battery according to claim 1, wherein the sulfone compound is an open chain sulfone.

3. The electrolyte solution for a secondary battery according to claim 2, wherein the sulfone compound is at least one selected from dimethyl sulfone, ethyl methyl sulfone, diethyl sulfone, methyl isopropyl sulfone, and ethyl isopropyl sulfone.

4. The electrolyte solution for a secondary battery according to claim 1, wherein the fluorine-containing cyclic acetal compound is represented by formula (3),

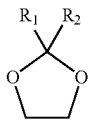
(3)

wherein $R_1$ and $R_2$ each independently represent alkyl group having 1 to 3 carbon atoms or hydrogen, and at least one hydrogen atom of formula (3) is substituted with fluorine.

5. The electrolyte solution for a secondary battery according to claim 4, wherein the fluorine-containing cyclic acetal compound is 2,2-bis(trifluoromethyl)-1,3-dioxolane and/or 2-(trifluoromethyl)-1,3-dioxolane.

6. The electrolyte solution for a secondary battery according to claim 1, wherein the cyclic carbonate compound is at least one selected from ethylene carbonate, propylene carbonate and 4-fluoro-1,3-dioxolan-2-one.

7. The electrolyte solution for a secondary battery according to claim 1, wherein a supporting salt is lithium hexafluorophosphate and/or lithium bis(fluorosulfonyl)imide, and a concentration of the supporting salt in the electrolyte solution is 0.5 mol/l or more and 2 mol/l or less.

8. A secondary battery comprising the electrolyte solution for a secondary battery according to claim 1.

9. The secondary battery according to claim 8, comprising a positive electrode comprising a positive electrode active material capable of inserting and desorbing Li at 4.35 V or more versus a standard electrode potential of Li.

10. The secondary battery according to claim 8, comprising at least one positive electrode active material selected from lithium metal composite oxides represented by formulae (4) to (7), $$Li_a(M_xMn_{2-x-y}Y_y)(O_{4-w}Z_w) \quad (4)$$

wherein $0.4 \leq x \leq 1.2$, $0 \leq y$, $x+y<2$, $0 \leq a \leq 1.2$, $0 \leq w \leq 1$, M is a transition metal and comprises at least one selected from the group consisting of Co, Ni, Fe, Cr and Cu, Y is a metal element and comprises at least one selected from the group consisting of Li, B, Na, Al, Mg, Ti, Si, K and Ca, and Z is at least one of F and Cl, $$Li_yNi_{1-x}M_xO_2 \quad (5)$$

wherein $0 \leq x < 0.8$, $0 < y \leq 1.0$ and M is at least one element selected, from the group consisting of Co, Al, Mn, Fe, Ti and B, $$Li(Li_xM_{1-x-z}Mn_z)O_2 \quad (6)$$

wherein $0.1 \leq x < 0.3$, $0.33 \leq z \leq 0.8$, and M is at least one of Co and Ni, and $$LiMPO_4 \quad (7)$$

wherein M is at least one of Co and Ni.

11. The secondary battery according to claim 1, comprising at least one negative electrode active material selected from graphite, Si oxides, and Si alloys.

12. A vehicle equipped with the secondary battery according to claim 1.

* * * * *